United States Patent [19]

Resch

[11] Patent Number: 4,885,910
[45] Date of Patent: Dec. 12, 1989

[54] TANDEM MASTER CYLINDER FOR A HYDRAULIC DUAL-CIRCUIT BRAKE SYSTEM OF A ROAD VEHICLE

[75] Inventor: Reinhard Resch, Stuttgart, Fed. Rep. of Germany

[73] Assignee: Daimler-Benz Aktiengesellschaft, Stuttgart, Fed. Rep. of Germany

[21] Appl. No.: 228,105

[22] Filed: Aug. 4, 1988

[30] Foreign Application Priority Data

Aug. 4, 1987 [DE] Fed. Rep. of Germany ....... 3725791

[51] Int. Cl.$^4$ .............................................. B60T 11/20
[52] U.S. Cl. ......................................... 60/562; 60/589
[58] Field of Search ........................ 60/562, 581, 589; 92/130 R, 130 D, 61, 62, 63, 65

[56] References Cited

U.S. PATENT DOCUMENTS

| | | | |
|---|---|---|---|
| 3,800,539 | 4/1974 | Le Marchand | 60/589 |
| 4,311,007 | 1/1982 | Gaiser | 60/589 |
| 4,649,707 | 3/1987 | Belart | 60/589 |
| 4,753,075 | 6/1988 | Nomura et al. | 60/589 |

FOREIGN PATENT DOCUMENTS

| | | | |
|---|---|---|---|
| 0067100 | 12/1982 | European Pat. Off. | 60/562 |
| 0074874 | 3/1983 | European Pat. Off. | 60/562 |
| 1430091 | 10/1968 | Fed. Rep. of Germany | 60/562 |
| 2217653 | 10/1972 | Fed. Rep. of Germany | |
| 2136663 | 2/1973 | Fed. Rep. of Germany | 60/562 |
| 2537868 | 3/1977 | Fed. Rep. of Germany | |
| 3214047 | 11/1983 | Fed. Rep. of Germany | 60/562 |
| 3241802A1 | 5/1984 | Fed. Rep. of Germany | |
| 3506087 | 8/1985 | Fed. Rep. of Germany | 60/562 |
| 0147171 | 12/1978 | Japan | 60/562 |
| 0448631 | 11/1975 | U.S.S.R. | 60/562 |

OTHER PUBLICATIONS

Alfred Teves GmbH, Brake Handbook, 9th Edition, 1986, p. 104.

Primary Examiner—Robert E. Garrett
Assistant Examiner—Thomas Denion

[57] ABSTRACT

In a tandem master cylinder, the primary and secondary outlet-pressure spaces of which are respectively limited in the axial direction by the push-rod or primary piston and a secondary piston designed as a floating piston or by the latter and an end wall fixed relative to the housing. A restoring spring urging the secondary piston into its basic position is arranged in a central cavity located in the secondary piston which is limited by a blind bore of the latter. The restoring spring is supported on the piston side on the inner face of the bottom of a pot-shaped supporting projection facing toward the primary piston and belonging to the secondary piston and, on the housing side, on a radial stop pin passing through a longitudinal slot of an intermediate part of the secondary piston extending between the two piston flanges which form the respective pressure-tight displaceable limitation of the secondary outlet-pressure space on the one hand and of the primary outlet-pressure space on the other hand. Because of this arrangement of the restoring spring urging the secondary piston into its basic position, that part of the cylinder housing which limits the secondary outlet-pressure space fixedly relative to the housing can be reduced by an amount corresponding approximately to the compressed block length of a restoring spring.

10 Claims, 2 Drawing Sheets

TANDEM MASTER CYLINDER FOR A HYDRAULIC DUAL-CIRCUIT BRAKE SYSTEM OF A ROAD VEHICLE

BACKGROUND AND SUMMARY OF THE INVENTION

The invention relates to a tandem master cylinder for a hydraulic dual-circuit brake system of a road vehicle with static brake circuits. Such a brake system includes primary and secondary outlet-pressure spaces which are assigned individually and in which brake pressure can be built up as a result of the displacement of a primary piston, controlled by pedal force, and of the displacement, co-related to the displacement of the primary piston of a secondary piston designed as a floating piston.

Tandem master cylinders of this type are generally known (see Alfred Teves GmbH, Brake Handbook, 9th edition, 1986, page 104, Bartsch-Verlag, Ottobrunn near Munich) and are offered, together with suitable brake boosters, as brake units for the widest variety of vehicle types by well-known brake manufacturers.

In such brake units which are installed in the engine space of a vehicle, in particular their constructional length is an important parameter and their limitation, which of course must not be at the expense of the functional reliability of a brake unit, is an important precondition for the construction of tandem master cylinders. Even only a slight reduction in the constructional length of, for example, a few millimeters is desirable and a reduction of the constructional length of, for example, 10 mm is viewed as a considerable technical achievement.

In tandem master cylinders of the known type, the pistons limiting the primary outlet-pressure space and the secondary outlet-pressure space are urged by restoring springs into their respective basic positions corresponding to the non-actuated state of the brake system and are characterized by the contact of these pistons against stops fixed relative to the housing. In this arrangement the stop determining the basic position of the secondary piston is designed as a pin fixed relative to the housing and passing radially through a longitudinal slot of an intermediate piece of the secondary piston connecting two flanges of this piston to one another. These flanges are arranged at an axial spacing from one another, one flange forming a movable limitation of the secondary outlet-pressure space, axially limited fixedly relative to the housing by an end wall of the cylinder housing, and the other flange forming a movable limitation of the primary outlet-pressure space relative to a follow-up space extending between these two piston flanges of the secondary piston and maintained in constant communicating connection with the brake-fluid storage tank. The restoring spring urging the secondary piston into its basic position is supported fixedly relative to the housing on the housing end wall limiting the secondary outlet-pressure space in the axial direction and engages on the piston flange of the secondary piston axially limiting the secondary outlet-pressure space. In this design of the master cylinder, in order to minimize its constructional length, the piston cross-sections and therefore their strokes and the restoring springs are coordinated with one another in such a way that, in a full-braking situation in which the maximum possible obtainable brake pressures are utilized, the master-cylinder pistons each executing their maximum stroke, the primary piston comes in contact against a supporting projection pointing towards the latter and located on the secondary piston and the latter, by means of a supporting projection pointing towards the end wall of the housing, comes in contact against this supporting projection or into the immediate vicinity of it and in these end positions of the pistons the two restoring springs are compressed to a block, these two supporting projections being used respectively for centering those portions of the restoring springs surrounding them coaxially.

A reduction in size of a tandem master cylinder of this type seems possible, at most, if the block lengths of its restoring springs, determining the minimum axial extents of the primary and the secondary outlet-pressure spaces of the tandem master cylinder, were reduced, although this could be achieved only by making the restoring springs weaker. However, this would necessarily entail an impairment of the functional properties of the tandem master cylinder, which would be unacceptable and, moreover, would also result in only a relatively insignificant reduction of the constructional length.

An object of the invention is, therefore, for a tandem master cylinder of the type mentioned in the introduction, to provide a design in which it is possible to produce the tandem master cylinder with a clearly reduced constructional length, without loss of functional reliability.

According to the invention, this object is achieved by configuring the restoring springs and the secondary piston so that the restoring springs extend concentrically to one another and thereby limit the overall length of the master cylinder arrangement.

The restoring spring urging the secondary piston of the master cylinder according to the invention into its basic position is transferred into a central inner space of the latter, with the two restoring springs being arranged coaxially in portions. The constructional length of that part of the cylinder housing limiting the secondary outlet-pressure space can thereby be reduced by approximately the compressed block length of the restoring springs otherwise arranged in the secondary outlet pressure space, thus making it possible to obtain a saving of constructional length of approximately 10 mm in certain preferred embodiments, that is to say an appreciable amount which must therefore also be considered a clear technical advance.

The restoring spring arranged within the secondary piston can at once be made sufficiently strong to generate the necessary pre-stress, as a result of which the secondary piston moves back into its basic position sufficiently quickly when the actuation of the brake system is cancelled.

Because, according to certain preferred embodiments of the invention, the restoring spring is supported on the stop piece fixed relative to the housing, via a sliding piece which can jointly execute rotational movements of the spring end facing the stop which occur both during the compression and during the relaxation of the spring, torsional stresses of the restoring spring, which could otherwise lead to lateral deflections of the latter and consequently to frictional losses, are as it were "compensated" in a simple way.

In a design provided according to certain preferred embodiments of the invention, a central valve causing the appropriate opening or shutting-off of the compensating flow path required for the secondary outlet-pressure space of the tandem master cylinder can be obtained without any appreciable contribution to the total constructional length of the tandem master cylinder, additional overflow cross-section being produced by means of a central passage channel located in the sliding piece.

The features of certain preferred embodiments provide an arrangement of the brake-pressure outlet of the secondary outlet-pressure space which is advantageous for producing the tandem master cylinder according to the invention with the shortest possible constructional length.

For producing a tandem master cylinder according to the invention, its design as a step cylinder according to certain preferred embodiments is especially advantageous, since in this case the portionally coaxial arrangement of the two restoring springs inside and outside the supporting projection of the secondary piston can be obtained especially simply in terms of construction.

Other objects, advantages and novel features of the present invention will become apparent from the following detailed description of the invention when considered in conjunction with the accompanying drawings.

DETAILED DESCRIPTION OF THE DRAWINGS

Figure 1:
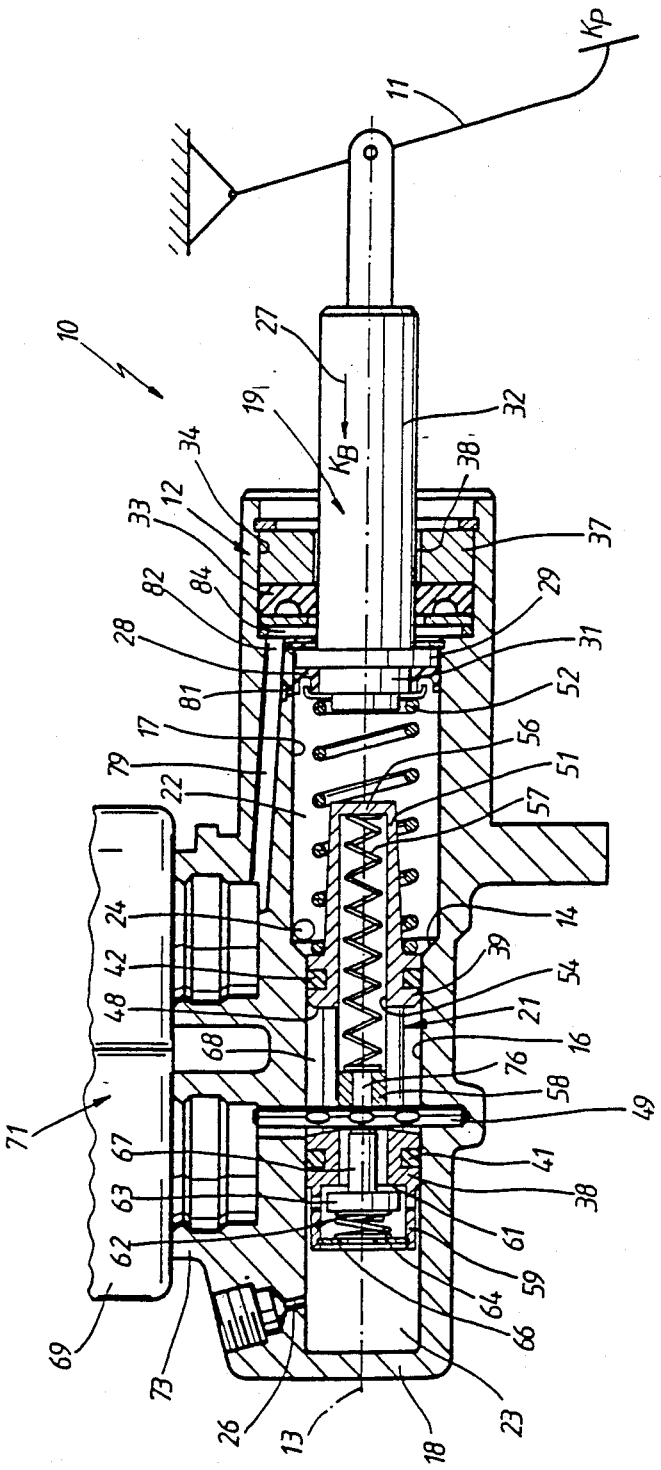
FIG. 1 is a schematic longitudinal sectional side view which shows a tandem master cylinder constructed according to a preferred embodiment of the invention with its pistons in a position corresponding to the non-actuated state of the brake system.
Figure 2:
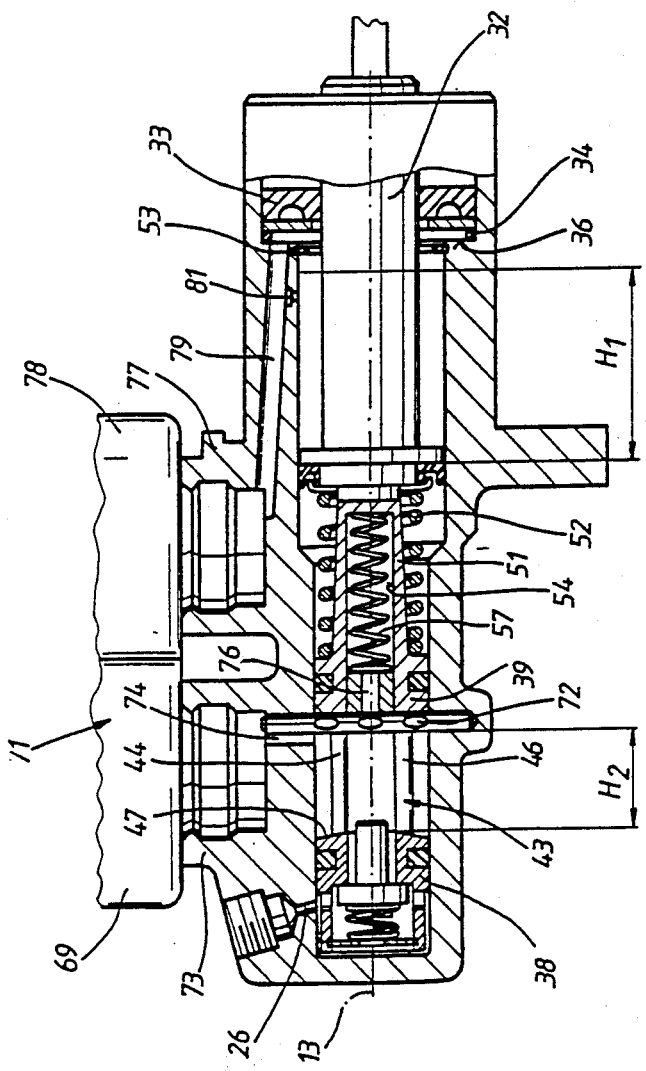
FIG. 2 shows, in a representation corresponding to that of FIG. 1, the tandem master cylinder according to FIG. 1 with the pistons in a position according to actuation with the maximum actuating force.

The tandem master cylinder 10 illustrated in FIGS. 1 and 2 is to be joined in use in combination with a pneumatic or hydraulic brake booster (not shown) as a brake unit for a road vehicle with a hydraulic dual-circuit brake system having static brake circuits and moreover being represented merely by a brake pedal 11 for the sake of simplicity. Further details of the vehicle and brake circuits are not included in order not to obscure the invention. Those skilled in the art of vehicle brake systems will readily be able to construct and operate the preferred embodiment described based on the present description.

In the special exemplary embodiment illustrated, chosen for the explanation, the tandem master cylinder 10 is designed as a so-called step cylinder. Housing 12 of master cylinder 10 has, as seen along a central longitudinal axis 13, two bore steps 16 and 17 which adjoin one another via a conical chamfer 14 and are coaxial relative to the central longitudinal axis 13 of the housing 12. The diametrically smaller piston step 16, as seen in the axial direction, is limited fixedly relative to the housing by an end wall 18 of the cylinder housing 12 remote from the pedal.

Within the tandem master cylinder 10, a primary piston designated as a whole by 19 and a secondary piston designated as a whole by 21 limit in an axially movable manner a primary outlet-pressure space 22 and a secondary outlet-pressure space 23. As a result of the displacement of these pistons 19 and 21 under the control of pedal force, it is possible to build up the static brake pressures $P_V$ and $P_H$ which, via the brake-pressure outlets 24 and 26 of these outlet-pressure spaces 22 and 23, are fed into the main brake lines (not shown) of the two brake circuits of the vehicle, for example a front-axle brake circuit connected to the primary outlet-pressure space 22 and a rear-axle brake circuit connected to the secondary outlet-pressure space 23.

The primary piston 19 is designated as a push-rod piston, on which the actuating force $K_B$ boosted, as appropriate, and proportional to the force $K_p$ with which the driver actuates the brake pedal 11, engages in the direction of the arrow 27.

The primary piston 19 forming the movable limitation on the pedal side of the primary outlet-pressure space 22 of the tandem master cylinder 10 is sealed off from the larger bore step 17 of the cylinder housing 12 by means of an annular gasket 28 fixed relative to the piston and designed as a lip gasket. This lip gasket 28 is arranged on that side of a radial end flange 29 of the primary piston 19 facing the primary outlet-pressure space 22 and is supported on this flange 29 in the axial direction. The lip gasket 28 surrounds a central supporting extension 31 of the primary piston 19 and is supported radially on its inner face on this supporting extension 31, the axial extent of which corresponds to that of the lip gasket 28.

The part of the primary piston 19 facing the brake pedal 11 is designed as a sturdy piston rod 32, solid in the special exemplary embodiment illustrated, which is itself sealed off, by means of an annular gasket 33 arranged fixedly relative to the housing and likewise designed as a lip gasket, from a third bore step 34 of the cylinder housing 12 which is diametrically somewhat larger than the bore step 17 limiting the primary outlet-pressure space 22 fixedly relative to the housing and which adjoins this bore step 17 via a housing step 36. Inserted fixedly relative to the housing into this third bore step 33 is a supporting ring 37 which in axial direction supports the annular gasket 33 sealing off the piston rod 32 of the primary piston 19 from the cylinder housing 12. This supporting ring 37 is provided with a central bore 38, through which the piston rod 32 of the primary piston 19 extends out of the housing 12 of the tandem master cylinder 10 on the same side as the pedal.

The secondary piston 21, which forms the axially movable limitation of the secondary outlet-pressure space 23 on one side and a second axially movable limitation of the primary outlet-pressure space 22 of the tandem master cylinder 10, is designed as a floating piston having two piston flanges 38 and 39 which are arranged at an axial spacing from one another and which are both arranged within the smaller bore step 16 of the cylinder housing 12 and are each sealed off from this bore step 16 by means of an annular gasket 41 and 42. Between the two piston flanges 38 and 39 of the secondary piston 21 there extends a tubular intermediate piece 43 of the piston 21. Intermediate piece 43 is provided with longitudinal slots 44 and 46 which are aligned with one another in the radial direction and which extend between the mutually confronting annular end faces 47 and 48 of the piston flanges 38 and 39 of the secondary piston 21. A tube 49 passes radially through these two longitudinal slots 44 and 46 of the tubular intermediate piece 43. Tube 49 is arranged fixedly relative to the housing so as to alternatively contact against the annular end face 47 or 48 of one or other of the flanges 38 and 39 of the secondary piston 21 to establish the possible end positions of the secondary piston 21. FIG. 2 depicts the secondary piston 21 in an end position corresponding to an actuation of the tandem master cylinder 10 with the maximum actuating force and FIG. 1 depicts the end position of secondary piston 21 with no brake actuation.

The secondary piston 21, on its side facing the primary piston 19, is provided with an externally frustconical supporting projection 51 which tapers only slightly towards the primary piston 19 and which forms a centering guide for one end of a prestressed restoring spring 52 designed as a helical spring, via which the primary piston 19 and the secondary piston 21 are supported relative to one another in the axial direction. As long as the tandem master cylinder 10 is not actuated, the primary piston 19 is urged by this restoring spring 52 into its basic position which is linked to a maximum volume of the primary outlet-pressure space 22, in which the piston flange 29 of the primary piston 19 is supported axially against a stop ring 53 fixed relative to the housing.

The secondary piston 21 is provided with a central blind bore 54 which passes through its two piston flanges 38 and 39 and the intermediate piece 43 connecting these to one another and which also extends over most of the length of the supporting projection which is thus designed as a pot-shaped sleeve which is closed off by means of its pot bottom 56 on the same side as the primary pressure space.

Arranged within this blind bore 54 is a second prestressed restoring spring 57 which is designed as a helical spring and which extends between a sliding piece 58 supported axially on the stop tube 49 and the bottom 56 of the sleeve-shaped supporting projection of the secondary piston 21. As long as the master cylinder 10 is not actuated, spring 57 urges the secondary piston 21 into its basic position shown in FIG. 1 with a corresponding maximum volume of the secondary outlet-pressure space 23. In the type of tandem master cylinder 10 of the preferred illustrated embodiment this restoring spring 57 arranged within the secondary piston 21 is pre-stressed "more strongly" than the restoring spring 52 supported on the primary piston 19, so that, as long as the tandem master cylinder 10 is not actuated, it can maintain the secondary piston 21 in the basic position even counter to the restoring force of the restoring spring engaging on the primary piston 19. If instead, and this is of course also contemplated according to other embodiments, a master cylinder used were of the type in which the secondary piston is tied to the primary piston in such a way that the maximum axial distance between the secondary piston and the primary piston is determined by the stop effect between the two pistons, then the restoring spring arranged within the floating piston would have to be pre-stressed "more weakly" than the restoring spring engaging on the primary piston, so that this for its part could maintain the composite piston structure as a whole, consisting of the primary piston and the secondary piston, in its basic position.

The secondary piston 21 is provided, on its side facing the secondary outlet-pressure space 23, with a short tubular extension 59, the outside diameter of which is slightly less than the diameter of the bore step 16 limiting the secondary outlet-pressure space 23 of the tandem master cylinder 10 fixedly relative to the housing in the radial direction. The inside diameter of extension 59 is clearly larger than the diameter of a mouth edge portion of the central blind bore 54 of the secondary piston 21 passing through the adjoining piston flange 38. Between that mouth edge portion of the blind bore 54 located on the same side as the secondary pressure space and the thin walled tubular extension 59 there is a radial annular step face 61 of the secondary piston 21 which forms the valve seat of a central valve designated as a whole by 62 and, in the special exemplary embodiment illustrated, is designed as a disc-seat valve.

The valve body 63 in the form of a circular disc is urged, by a valve spring 64 supported axially on a supporting ring 66 inserted firmly into the tubular extension 59 in the arrangement shown, in the direction of its position up against the valve seat 61 so as to seal off the blind bore 54 from the secondary outlet-pressure space 23. The valve body 63 is provided with a stop shank 67 which projects into the blind bore 54 of the secondary piston 21 and the axial length of which is somewhat greater than the axial distance between the valve seat face 61 and the inner annular end face 47 of the piston flange 38 of the secondary piston 21 movably limiting the secondary outlet-pressure space 23. When tandem master cylinder 10 is not actuated and accordingly the secondary piston 21 is in its basic position shown in FIG. 1, the valve body 63 is lifted from the valve seat 62 as a result of the stop effect of the stop pin 67 with the stop tube 49 fixed relative to the housing and the central valve 62 assumes its open position, in which the secondary outlet-pressure space 23 of the tandem master cylinder is in communicating connection with the follow-up space 68 which is assigned to the secondary outlet-pressure space or to the brake circuit connected to this and which is for its part in constant communicating connection with that chamber 69 of the brake-fluid storage tank 71 of the brake system 10, 11 assigned to this brake circuit. This communicating connection between the chamber 69 of the brake-fluid storage tank 71 and the follow-up space 68, which comprises the annular space extending between the two piston flanges 38 and 39 of the secondary piston 21 and the interior of the blind bore 54 of the secondary piston 21 communicating with the latter via the longitudinal slots 44 and 46 of the piston intermediate piece 43, is obtained, for example, by means of overflow orifices 72, merely indicated diagrammatically and opening into this follow-up space, which for its part opens into the connection piece 73, via which the brake-fluid storage tank 71 is connected to this follow-up space 68. If, for example, a solid stop pin is provided instead of the above-described stop tube 49, this communicating connection between the brake-fluid storage tank 71 and the follow-up space 68 can be obtained alternatively if such a stop pin has, in its portion passing through the connecting bore 74, a cross-sectional form which, although ensuring that this pin is fixed positively in the connecting bore 74, nevertheless only partially fills the cross-section of the latter. In order, in all possible positions of the secondary piston 21, especially in its basic position, to guarantee the communicating connection between the follow-up space 68 and the portion of the blind bore 54 of the secondary piston 21 through which the stop shank 67 of the valve body 63 passes, the sliding piece 58, on which the restoring spring 57 urging the secondary piston 21 into its basic position is supported, is provided with a central overflow channel 76. The mouth orifice of channel 76 facing the stop pin or stop tube 49 always has a sufficiently free cross-sectional area, through which brake fluid can flow "laterally" past the stop tube 49, provided that the sliding face of the sliding piece 58 facing the tube 49 is a plane annular face.

The housing channel 69 reaches into the third bore step 34 of the cylinder housing 12, within which the annular gasket 33 fixed relative to the housing forms the pressure-tight axial limitation, on the pedal side, of the follow-up space 84 which is assigned to the primary outlet-pressure space 22 and of which the pressure-tight limitation on the same side as the outlet-pressure space is formed by the lip gasket 28 of the primary piston 19 fixed relative to the piston. As soon as the piston flange 29 of the primary piston 19 has passed over the compensating bore 81 completely, brake fluid can also flow via the latter into this follow-up space 84 which can increase constantly in the course of the pressure build-up stroke of the primary piston 19.

FIG. 2 shows that position of the master cylinder pistons 19 and 21 which these assume after they have executed their theoretically maximum strokes $H_1$ and $H_2$. In this position they have reached their end positions which once again are marked by a stop effect and are alternative to the basic position shown in FIG. 1, and in which the primary piston 19 and the secondary piston 21 rest directly against one another and the secondary piston 21 rests with its tubular extension 59 virtually against the end wall 18 of the cylinder housing.

Furthermore, the restoring springs 52 and 57 are designed so that, in these end positions of the primary piston 19 and of the secondary piston 21, they are compressed 'to a block', that is to say their turns are arranged respectively resting directly or at least approximately against one another, this minimum block length of the springs 52 and 57 are equal in the exemplary embodiment illustrated.

In this design of the restoring springs 52 and 57 of the master cylinder 10 and the arrangement of these so that these springs 52 and 57 are arranged concentrically, in every piston position, over a portion corresponding to their block length, the constructional length of the master cylinder 10 is minimized to that extent.

Although in practice, that is to say in a good ventilation state of the brake system, this end position is not reached, a locking of the wheel brakes occurring "before" pistons 19 and 21 reach the said positions, nevertheless with a poor degree of ventilation of the brake system it may be necessary for the pistons 19 and 21 to be displaceable into their end positions as shown in FIG. 2, in order to achieve a braking effect which is still sufficient.

In the exemplary embodiment illustrated, it becomes easier to arrange the restoring spring 57 within the secondary piston 21 so as to reduce the axial space requirement of the tandem master cylinder 10 if the compensating flow path, via which, in the basic position of the primary piston 19, pressure compensation between the primary outlet-pressure space 22 and the brake-fluid storage tank 71 can take place, is obtained by means of a compensating bore 81. The primary piston 19 then requires no extension, projecting axially into the primary outlet-pressure space 22, for receiving a central valve, as shown in respect of the secondary piston 21 for the central valve 62.

When the tandem master cylinder 10 is actuated, after a small initial portion of the brake-pressure build-up stroke of the secondary piston 21, the central valve 62 changes to its closing position which shuts off the secondary outlet-pressure space 23 of the tandem master cylinder from the follow-up space 68 and starting from which the brake-pressure build-up in the secondary outlet-pressure space 23 can be completed.

With regard to the primary outlet-pressure space, the compensating flow path leading via the central valve 62 with regard to the secondary outlet-pressure space 23 corresponds to a compensating flow path which, in the exemplary embodiment illustrated, leads from a second chamber 78 of the brake-fluid storage tank 71 via its connection piece 77, a housing channel 79 extending from this and a compensating bore 81 extending from the latter and designed as a so-called "snifter hole", to the primary outlet-pressure space 22 of the master cylinder. This compensating flow path 78, 79, 81 is opened only as long as the brake system is not actuated, that is to say the primary piston 19 is in its basic position shown in FIG. 1, in which the compensating bore 81 opens into the primary outlet-pressure space 22 immediately "next to" the annular gasket 28 of the primary piston 19 within the said primary outlet-pressure space 22. When the master cylinder is actuated, as soon as the primary piston 19 has executed in the direction of the arrow 27 a small initial portion of its brake-pressure build-up stroke corresponding to the diameter of the compensating bore 81, this compensating flow path 78, 79, 81 is blocked, after which any further displacement of the primary piston 19 in the direction of the arrow 27 leads to an increase in the pressure in the primary outlet-pressure space 22.

The supporting projection 51 of the secondary piston 21 can thereby be made relatively longer, this being advantageous for accommodating the restoring spring 57.

In contrast to this, the compensating flow path necessary for the secondary outlet-pressure space 23 can be obtained directly by means of the central valve 62 which, although contributing slightly to the constructional length of the secondary piston and therefore also to the axial extent of the secondary outlet-pressure space, can nevertheless be "compensated" again if, as illustrated, the brake-pressure outlet 26 of the secondary outlet-pressure space 23 is arranged laterally relative to this and, as seen in the representation of FIG. 2, opens, immediately next to the piston flange 38 of the secondary piston 21 sealing off the secondary outlet-pressure space 23 from the follow-up space 68, into the secondary outlet-pressure space 23 which, in the position shown, is still only in the form of an annular gap.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. Tandem master cylinder for a hydraulic dual-circuit brake system of a road vehicle with static brake circuits, with primary and secondary outlet-pressure spaces which are assigned individually to said brake circuits and in which brake pressure can be built up as a result of the displacement of a primary piston, controlled by actuating pedal force, and of a displacement, co-related to the displacement of the primary piston, of a secondary piston designed as a floating piston, with a first restoring spring which is supported axially on the primary piston and on the secondary piston, and with a second restoring spring which is supported axially on the secondary piston and on a cylinder housing and which, in the non-actuated state of the brake system, urge the two pistons into their basic positions marked by the contact of the pistons against stops fixed relative to the housing, one of said stops being assigned to the secondary piston and projecting radially into a longitudinal slot of an intermediate piece of the secondary piston and extending between two piston flanges of the secondary piston which are sealed off from the cylinder housing and are arranged at an axial spacing from one another, one of which flanges forms a pressure-tight delimitation of the secondary outlet-pressure space relative to a follow-up space assigned to the latter and in constant communicating connection with the brake-fluid storage tank, and of which the other flange forms a pressure-tight delimitation of the primary outlet-pressure space relative to this follow-up space, the secondary piston being provided with a central supporting projection which points towards the primary piston and is surrounded coaxially by a portion of the restoring spring engaging on the two master-cylinder pistons and which has an axial length corresponding at least to the compressed block length of this restoring spring and being approximately equal to the block length of this spring, wherein the secondary piston is provided with a central blind bore which passes through at least the piston intermediate piece equipped with the slot and belonging to the secondary piston and its piston flange movably limiting the primary outlet-pressure space of the tandem master cylinder on one side and which also extends over a predominant part of the length of the supporting projection facing the primary piston in such a way that the supporting projection forms a pot-shaped axial widening of the cylindrical interior of the secondary piston, wherein the restoring spring urging the secondary piston into its basic position is designed as a helical spring which is inserted into this blind bore and which is supported, on the one hand, on the stop piece and, on the other hand, on the inner face of the bottom of the pot-shaped supporting projection of the secondary piston, and wherein the compressed block length of this spring corresponds approximately to the clear axial depth of this supporting projection and is approximately equal to same.

2. Tandem master cylinder according to Claim 1, wherein the stop piece is designed as a pin or as a tube which passes through mutually aligned longitudinal slots of the intermediate piece of the secondary piston and which is arranged within the cross-section of a connection piece via which a brake-fluid storage tank of the brake system is maintained in constant communicating connection with the follow-up space assigned to the secondary outlet-pressure space and located in the tandem master cylinder, and wherein the restoring spring is supported on the stop piece via a sliding piece with a plane sliding face.

3. Tandem master cylinder according to Claim 2, wherein the blind bore of the secondary piston also passes through the piston flange movably limiting the secondary outlet-pressure space and belonging to the secondary piston, and wherein the secondary piston is provided with a short tubular extension which projects into the secondary outlet-pressure space and of which the outside diameter is smaller than that of the housing bore forming the radial limitation of the secondary outlet-pressure space and of which the inside diameter is larger than the diameter of the blind bore, of which the mouth orifice on the same side as the outlet-pressure space is stepped relative to the tubular extension by means of a plane annular face forming the valve seat of a central valve, of which the valve body, in the form of an annular disc, is urged against the valve seat by a valve spring supported on a centrally open supporting ring fastened to the extension, the valve body being provided with a stop shank which passes through that portion of the blind bore of the secondary piston opening into the secondary outlet-pressure space and which is longer than this bore portion by the amount of the opening stroke of the central valve and, as seen in the basic position of the secondary piston, maintains the valve body in its position which is lifted off from the valve seat and in which the secondary outlet-pressure space is in communicating connection with the follow-up space limited in the axial direction by the two piston flanges.

4. Tandem master cylinder according to Claim 3, wherein the sliding piece is provided with a centrally continuous longitudinal bore.

5. Tandem master cylinder according to Claim 4, wherein the brake-pressure outlet of the secondary outlet-pressure space is arranged in a part of the housing block forming its radial limitation, the mouth of this outlet being arranged on the same side as the pressure space being arranged at an axial distance from the end wall of the housing which is at least approximately the diameter of this mouth orifice less than the axial length of the piston extension located on the same side as the secondary pressure space.

6. Tandem master cylinder according to Claim 1, wherein the cylinder housing is designed as a step cylinder, within which the secondary piston is guided in a diametrically smaller bore step and the primary piston is guided in a diametrically larger bore step of the cylinder housing displaceably in a pressure-tight manner.

7. Tandem master cylinder arrangement for a hydraulic dual-circuit brake system for a vehicle, comprising:
cylinder housing means defining longitudinally extending cylinder bore means,
a primary piston slidably guided in the cylinder bore means and being operable to control brake fluid pressure in a primary brake circuit,
a secondary piston slidably guided in the cylinder bore means in axial alignment with the primary piston, said secondary piston being a floating piston which is actually movable in response to movement of the primary piston and which is operable to control brake fluid pressure in a secondary brake circuit,
first restoring spring means interposed between the primary and secondary pistons,
second restoring spring means interposed between the cylinder housing means and the secondary piston, and
stop means extending into the travel path of the secondary piston and serving to limit movement of the secondary piston with respect to the cylinder housing means,
wherein said secondary piston includes a central supporting projection facing the primary piston, said first restoring spring means surrounding the central supporting projection with said central supporting projection having an axial extent corresponding to the fully compressed block length of the first restoring spring means,
wherein said secondary piston is provided with a central blind bore extending over a predominate part of the length of the central supporting projection, and wherein said second restoring spring means is disposed in said central blind bore and extends over substantially the full axial length of the first restoring spring means when said first and second restoring spring means are in their respective fully compressed block length.

8. An arrangement according to Claim 7, wherein the stop means is a stop pin means which extends radially through axial slot means in said secondary position.

9. An arrangement according to Claim 7, wherein an axial end face of the central supporting projection abuts the end face of the primary piston when the primary piston is in a brake actuated position.

10. An arrangement according to Claim 7, wherein said first and second restoring spring means are constructed as respective coil springs.

* * * * *